United States Patent
Fischer et al.

(10) Patent No.: US 8,320,905 B2
(45) Date of Patent: Nov. 27, 2012

(54) METHOD FOR EXCHANGING DATA BETWEEN A MOBILE TELEPHONE AND A FIXED LINE TELEPHONE

(75) Inventors: Kai Fischer, Baldham (DE); Steffen Fries, Baldham (DE); Andreas Köpf, München (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 0 days.

(21) Appl. No.: 12/918,529

(22) PCT Filed: Feb. 6, 2009

(86) PCT No.: PCT/EP2009/051379
§ 371 (c)(1),
(2), (4) Date: Oct. 4, 2010

(87) PCT Pub. No.: WO2009/124790
PCT Pub. Date: Oct. 15, 2009

(65) Prior Publication Data
US 2011/0014895 A1    Jan. 20, 2011

(30) Foreign Application Priority Data
Apr. 9, 2008   (DE) .......................... 10 2008 018 003

(51) Int. Cl.
*H04B 5/00*    (2006.01)
*H04B 7/00*    (2006.01)
*G08B 13/14*   (2006.01)

(52) U.S. Cl. .................. 455/426.1; 455/41.1; 455/41.2; 340/572.1

(58) Field of Classification Search ................ 455/426.1
See application file for complete search history.

(56) References Cited

U.S. PATENT DOCUMENTS

| 2003/0065918 A1 * | 4/2003 | Willey .......................... 713/168 |
| 2005/0215233 A1   | 9/2005 | Perera et al. |
| 2006/0183462 A1   | 8/2006 | Kolehmainen |
| 2007/0202807 A1 * | 8/2007 | Kim ............................ 455/41.2 |

(Continued)

FOREIGN PATENT DOCUMENTS

EP    1237333 A1    9/2002
(Continued)

OTHER PUBLICATIONS

English Machine Translation of EP 1603317.*
(Continued)

*Primary Examiner* — Charles Appiah
*Assistant Examiner* — Natasha Cosme
(74) *Attorney, Agent, or Firm* — Buchanan Ingersoll & Rooney PC

(57) ABSTRACT

The invention relates to a method for exchanging data between a mobile telephone and a fixed line telephone. According to the invention, a mobile telephone equipped with Near Field Communication (NFC) technology and a fixed line telephone that is also equipped with NFC technology are initially placed in a reception range, subsequently the mobile telephone and the fixed line telephone are coupled by means of the NFC technology, and then data is transmitted between the mobile telephone and the fixed line telephone by means of the NFC technology. Said coupling occurs when the mobile telephone and the fixed line telephone are authenticated, and two different NFC technologies are used for the authentication of the mobile telephone and the fixed line telephone, and the subsequent transmission of data.

4 Claims, 1 Drawing Sheet

U.S. PATENT DOCUMENTS

2007/0265033 A1* 11/2007 Brostrom ............... 455/557
2007/0287498 A1   12/2007 Wang et al.
2010/0211685 A1*  8/2010 McDowall et al. ........ 709/227

FOREIGN PATENT DOCUMENTS

| EP | 1603317 A2 | 12/2005 |
| EP | 1781002 A1 | 5/2007 |
| WO | 03081787 A2 | 10/2003 |
| WO | 2007112788 A1 | 10/2007 |

OTHER PUBLICATIONS

International Search Report for PCT/EP2009/051379 (Form PCT/ISA/210) (German Translation).
International Search Report for PCT/EP2009/051379 (Form PCT/ISA/210) (English Translation).
Written Opinion of the International Searching Authority for PCT/EP2009/051379 (Form PCT/ISA/237) (German Translation).
Written Opinion of the International Searching Authority for PCT/EP2009/051379 (Form PCT/ISA/237) (English Translation).
International Preliminary Report on Patentability for PCT/EP2009/051379 (Form PCT/IB/373 and PCT/ISA/237) (German Translation).
International Preliminary Report on Patentability for PCT/EP2009/051379 (Form PCT/IB/338, PCT/IB/373 and PCT/ISA/237) (English Translation).

* cited by examiner

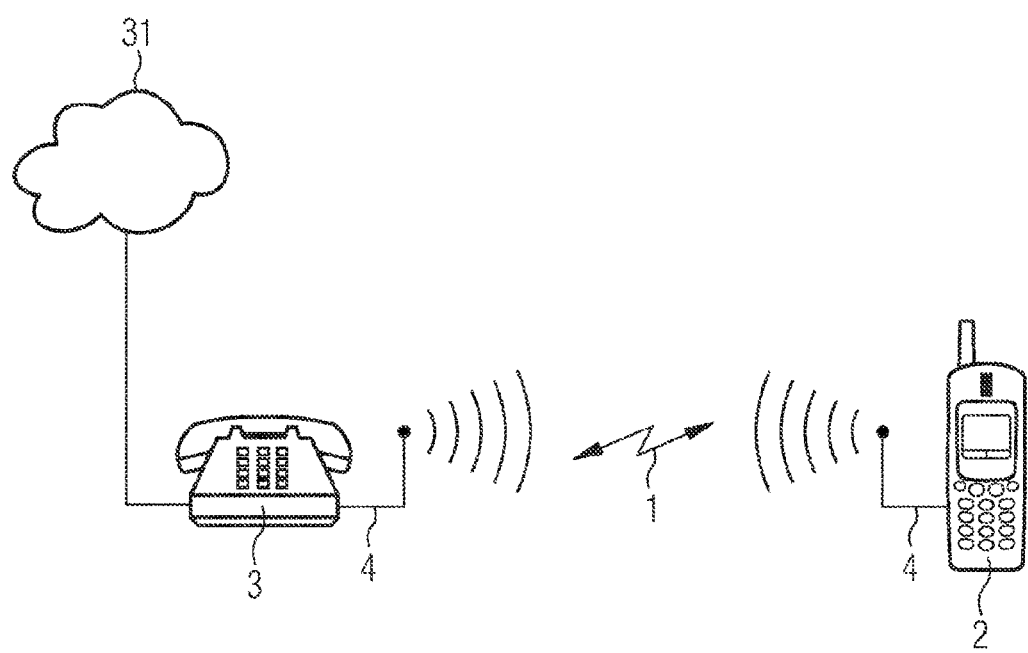

METHOD FOR EXCHANGING DATA BETWEEN A MOBILE TELEPHONE AND A FIXED LINE TELEPHONE

CROSS-REFERENCE TO RELATED APPLICATIONS

This application is the United States national phase under 35 U.S.C. §371 of PCT International Application No. PCT/EP2009/051379, filed on Feb. 6, 2009, and claiming priority to German Application No. 10 2008 018 003.3, filed on Apr. 9, 2008. Those applications are incorporated by reference herein.

BACKGROUND OF THE INVENTION

1. Field of the Invention

Embodiments are in the field of exchanging data between a mobile telephone and a fixed line telephone.

2. Background of the Related Art

Companies with consulting or service agreements equip most of their employees with mobile telephones. In addition, there is a trend towards use of mobile workstations, especially in the consulting field. In spite of this trend, fixed network communication, such as that combined with a fixed installed headset, is typically simpler, more comfortable and provides better voice quality. For this reason, fixed line telephones are also available in offices and conference rooms in the above-mentioned environments. However, synchronization of an individual phone number is problematic in this situation and especially in the form of data stored on the mobile telephone such as phone book, address book, calendar, etc.

Saving address books and call lists on the fixed line telephone is not optimal because, on one hand, the data must be saved twice and on the other hand, telephones, especially fixed line telephones, may be used by multiple people. This is most notably the case with mobile workstations and in conference rooms.

Up until now, the above-described problem has mainly been dealt with by call forwarding, duplicate data management and manual entry of phone numbers.

BRIEF SUMMARY OF THE INVENTION

Embodiments of the invention may provide a method for exchanging data, particularly contact and communication data, such as the phone book, address book, calendar, etc., between a mobile telephone and a fixed line telephone.

Transfer of data, such as phone book, address book, calendar, etc., from one device to another is provided by coupling of the fixed line telephone and mobile telephone by means of Near Field Communication (NFC) technology, such as Radio Frequency Identification (RFID) or Bluetooth technology. For this, both the fixed line telephone as well as the mobile telephone are equipped with NFC technology. Both devices only need to be located within range of reception for synchronization of the data to occur. Coupling takes place through authentication of the mobile telephone and fixed line telephone. For authentication of the mobile telephone and fixed line telephone when the fixed line telephone is preferably based on internet protocol (IP-based), and the subsequent data transfer and/or data exchange, the invention offers two different protocols or NFC technologies with differing security characteristics. For this procedure, secure coupling of both technologies is fundamental to the invention.

BRIEF DESCRIPTION OF THE FIGURE

FIG. 1 is a schematic representation of partially encrypted media information.

DETAILED DESCRIPTION OF THE INVENTION

If RFID is used as the NFC technology, a high-frequency alternating electromagnetic field is generated, for example, in an RFID reader installed in the fixed line telephone which reaches the antenna of an RFID tag arranged in a mobile telephone. In the case of inductively powered RFID tags, an induced current is produced in the antenna coil, as soon as it comes into the electromagnetic field. This current is rectified and used to charge a condenser for short-term storage which, during the reading process provides the power supply for a microchip integrated into the RFID tag. In active RFID tags, an installed battery takes over this supply of power. With semi-active tags, the microchip is supplied power by the battery only. It is important to emphasize that in addition to inductively powered RFID systems, there are also capacitively powered RFID systems, surface wave RFID systems, etc.

Bluetooth works differently as NFC technology. Bluetooth devices, as so-called short range devices, transmit in the license-free ISM band. Theoretically, a data transmission rate of 706.25 kbit/s can be achieved during download with a simultaneous 57.6 kbit during upload. This is called an asymmetrical data transmission.

RFID is preferred for authentication of the devices, while Bluetooth is preferred for data transmission. An authentication via RFID is advantageous because there are already asymmetric cryptography protocols and specifications for RFID. For Bluetooth, use of certificates is planned initially for Version 3. Bluetooth, however, allows higher transmission rates and ranges for data transfer.

Both the mobile telephone as well as the fixed line telephone are preferably equipped with certificates such as a public key, a device signature or device certificate and the associated private key. Connection establishment by means of this certificate guarantees a unique assignment and authentication of the individual devices and allows a secure negotiation of security parameters for the protected transfer or exchange of data.

Preferably, the mobile telephone will contain a semi-active RFID tag. The power supply for the microchip of the RFID tag is provided by the mobile telephone battery. The fixed line telephone contains an RFID reader.

Bluetooth is used for additional transmission and during exchange of data, for example, phone number, address book, etc. Use of pre-shared keys (PSK) is not required here, because the devices are already authenticated by the certificate exchanges via RFID and the associated challenge response procedure and can use this mechanism to negotiate a session key.

For an authentication, preferably a common certification authority (CA) exists and the public cryptographic keys designated as public keys belonging to each device are preferably known.

In the case of device-based certificates, the public cryptographic key is preferably tied to a device-specific characteristic, e.g. a telephone number. In this way it is also possible that multiple mobile telephones can be simultaneously authenticated against one fixed line telephone and a mobile telephone may be manually selected from this list as often can be the case in conference rooms. In a business environment, this is relatively simple to implement.

For purely public keys, these must be exchanged prior to the first connection with the terminal devices. A key store located in one terminal device can also be accessed here, independent of whether it is dealing with a mobile telephone or a fixed line telephone at this point.

In the application, the mobile telephone and the fixed line telephone each have their own phone numbers. As soon as the mobile telephone is located within the reading range of the fixed line telephone, it is possible to establish a connection as described above. After connecting successfully, depending on the preferred configuration, the phone number of the mobile telephone is taken over by the fixed line telephone and the address book or other data as applicable is transferred or exchanged.

If the mobile phone number cannot be taken over by the fixed line telephone for technical reasons, automatic call forwarding can also be provided.

In doing so, it is possible to actually duplicate the data or access the mobile phone book with the associated Bluetooth profile (PBAP—Phone Book Access Profile). Ideally, this can also be configured optionally.

After that, all calls will only be received on the fixed line telephone until the connection is terminated. All other data on the mobile telephone, such as the caller list, etc. becomes accessible via the fixed line telephone.

This data is preferably removed from the fixed line telephone memory again after the disconnection. This is advantageous or even necessary in that the fixed line telephone used with a mobile workstation or in a conference room can be used by other people and the data from the mobile telephone should not be readable by other people. This can be dictated by a so-called security policy, for example.

The connection can be terminated by using a key on the fixed line telephone and/or mobile telephone.

Alternatively, it is also possible to terminate the connection between the devices as soon as the devices are out of reception range for a predefined length of time, e.g. more than one minute. The Bluetooth range of reception is significant here and not the RFID reception range, because the RFID is only used for authentication.

For easier handling in practice, the connection information can be saved in the mobile telephone as well as the associated backend infrastructure. In this way, after connecting successfully between a mobile telephone and fixed line telephone, it is possible to use data from a previous connection to connect again.

For example, after establishing the first connection, the media access control (MAC) addresses of the devices and the associated link keys can be saved and used again for all further connections. This facilitates logging in to frequently used fixed line telephones.

This procedure depends, however, preferably on the respective security policy, which can be enforced through the respective terminal devices, preferably the fixed line telephones. Preferably, this procedure should not be possible in highly sensitive environments. A "rekeying" by means of the mobile telephone is always possible according to the preferences of the user.

In practice, it would make sense to limit the range of reception for the RFID system from a few centimeters up to a meter at most, in order to avoid undesired login to a system and to impede potential "Man-in-the-Middle" attacks. Man-in-the-Middle attacks are in fact very difficult to carry out in the case of mutual authentication, in which first the reader and then the tag is authenticated, but nevertheless they are not impossible.

A confirmation of the coupling of the mobile telephone and the fixed line telephone can be performed by pressing a button also called "accept button" on the fixed line telephone.

For cases in which multiple mobile telephones have logged into one fixed line telephone for coupling, these can be listed on the fixed line telephone and a certain mobile telephone or participant can be selected by pressing a button also called "accept button" on the fixed line telephone. In doing so, only this participant has access to the fixed line telephone.

It is important to emphasize that a key required for authentication can also be manually entered.

The invention will be explained in more detail based on the following embodiment examples.

FIG. 1. shows how the exchange of data (1) between a mobile telephone (2) and a fixed line telephone (3) connected to a fixed network (31) takes place; first a mobile telephone (2) equipped with near field communication (NFC) technology (4) and a fixed line telephone (3), also equipped with NFC technology (4), are brought into the range of reception, then a coupling of the mobile telephone (2) and fixed line telephone (3) takes place; data (1) is then transmitted between mobile telephone (2) and fixed line telephone (3), with the coupling being achieved by an authentication of mobile telephone (2) and fixed line telephone (3) using two different NFC technologies for the authentication and subsequent transmission of data (1).

Coupling the fixed line telephone and the mobile telephone by means of near field communication (NFC) technology, for example (RFID) or Bluetooth, allows the transfer of data, such as telephone numbers or phone book, address book, calendar, etc. from one device to another. In the present case this means that both the fixed line telephone as well as the mobile telephone must be equipped with NFC technology. Both devices only need to be located within range of reception for synchronization of the data to occur.

In the first embodiment example, the mobile telephone and the fixed line telephone conduct a mutual authentication via RFID and afterwards can transfer further data over an encrypted channel. The session key transmitted over this channel is then used for the subsequent Bluetooth connection.

An authenticated Diffie-Hellman key exchange or also a RSA key encryption can be used as a cryptographic protocol here. An additional confirmation of the connection being established by means of a personal identification number (PIN) is not necessary in this case. A confirmation by pressing a button on the fixed line telephone is advisable, however. Even if undesired login attempts rarely result during initialization of the connection when a relatively small reading range is used, reflections and undesired range increases can result again and again during use of wireless technology. For this reason, it is simpler to have an accept button on the fixed line telephone, especially in open-office environments. In scenarios in which multiple mobile telephones are logged into one fixed line telephone, a certain participant can be selected with the accept button, e.g. based on the mobile phone number. In doing so, only this participant has access to the fixed line telephone.

In a second embodiment example, a mobile telephone and fixed line telephone carry out mutual authentication, for example, via use of an elliptical curve cryptosystem. No additional keys are subsequently transmitted. Based on the ID that is exchanged during the authentication phase, the fixed line telephone can call up configuration data from the infrastructure. Additionally, the fixed line telephone can generate a session key that is shown on the display and must be entered on the mobile telephone. This link key from the pairing phase is then used for the subsequent Bluetooth connection. The link key can be saved in the user profile, so that this phase can be skipped the next time a connection is established. The security policy dictates whether this is allowed. This key is likewise saved in the mobile telephone, together with the MAC address of the fixed network telephone. The user can, however, also force the link key to be updated on a new login, regardless of the security policy.

The invention claimed is:

1. A system for exchanging data between a mobile telephone and a fixed line telephone comprising:
   a mobile telephone, the mobile telephone equipped with a first Near Field Communication (NFC) technology and a second NFC technology, the second NFC technology differing from the first NFC technology;
   a fixed line telephone equipped with first NFC technology and second NFC technology;
   the fixed line telephone and the mobile telephone coupling via a transmission of first data between the fixed line telephone and mobile telephone made in accordance with the first NFC technology when the mobile telephone is positioned within a reception range of the first NFC technology of the fixed line telephone, the first data comprising authentication data for performing authentication; and
   the mobile telephone transmitting second data to the fixed line telephone when the mobile telephone and fixed line telephone are coupled together utilizing the second NFC technology, the second data comprising telephone number data of the mobile telephone such that the fixed line telephone takes over the phone number of the mobile telephone for as long as the mobile telephone is coupled to the fixed line telephone after receipt of the telephone number data of the mobile telephone such that all calls to the phone number of the mobile telephone are received only by the fixed line telephone; and
   wherein the mobile telephone is a first mobile telephone and wherein the system further comprises a second mobile telephone that is coupled to the fixed line telephone such that the fixed line telephone also controls a phone number of the second mobile telephone.

2. The system of claim 1 wherein the second data also comprises address book data of the first mobile telephone and the address book data is transmitted such that the address book data is usable by the fixed line telephone.

3. The system of claim 1 wherein the fixed line telephone has a button that is pressable to confirm the coupling of the fixed line telephone and the mobile telephone.

4. The system of claim 1 wherein said first NFC technology is Radio Frequency Identification (RFID) and said second NFC technology is Bluetooth wireless technology and wherein the mobile telephone has an RFID tag and the first NFC technology of the fixed line telephone has an RFID reader.

* * * * *